(12) United States Patent
Fout et al.

(10) Patent No.: US 7,134,353 B2
(45) Date of Patent: Nov. 14, 2006

(54) METHOD AND APPARATUS FOR DETERMINING SYSTEM INTEGRITY FOR AN OILFIELD MACHINE

(75) Inventors: Gary E. Fout, Cypress, TX (US); Cong Wang, Katy, TX (US)

(73) Assignee: M-I LLC, Houston, TX (US)

( * ) Notice: Subject to any disclaimer, the term of this patent is extended or adjusted under 35 U.S.C. 154(b) by 148 days.

(21) Appl. No.: 10/872,821

(22) Filed: Jun. 21, 2004

(65) Prior Publication Data
US 2005/0279154 A1    Dec. 22, 2005

(51) Int. Cl.
*F04B 49/00*    (2006.01)
(52) U.S. Cl. .................... 73/865.9; 73/168
(58) Field of Classification Search ............... 73/168, 73/865.9, 865.3; 494/10; 96/414; 340/682, 340/680
See application file for complete search history.

(56) References Cited

U.S. PATENT DOCUMENTS

| | | | |
|---|---|---|---|
| 5,473,209 A | 12/1995 | Lamb | |
| 5,477,093 A | 12/1995 | Lamb | |
| 5,477,094 A | 12/1995 | Lamb | |
| 5,668,424 A | 9/1997 | Lamb | |
| 5,691,587 A | 11/1997 | Lamb | |
| 5,712,519 A | 1/1998 | Lamb | |
| 5,712,520 A | 1/1998 | Lamb | |
| 5,739,627 A | 4/1998 | Lamb | |
| 5,834,872 A | 11/1998 | Lamb | |
| 5,857,955 A | 1/1999 | Phillips et al. | |
| 5,880,548 A | 3/1999 | Lamb | |
| 5,903,075 A | 5/1999 | Lamb | |
| 5,909,073 A | 6/1999 | Lamb | |
| 6,005,317 A | 12/1999 | Lamb | |
| 6,043,578 A | 3/2000 | Lamb | |
| 6,072,258 A | 6/2000 | Lamb | |
| 6,242,832 B1 | 6/2001 | Lamb | |
| 6,337,527 B1 | 1/2002 | Lamb | |
| 6,398,509 B1 * | 6/2002 | Okazaki et al. | 417/44.1 |
| 6,623,251 B1 * | 9/2003 | Nawamoto et al. | 417/290 |

OTHER PUBLICATIONS

International Search Report issued in PCT International Application No. PCT/US05/21683 mailed Feb. 22, 2006, 10 pages.

* cited by examiner

*Primary Examiner*—Robert Raevis
(74) *Attorney, Agent, or Firm*—Osha Liang LLP

(57) ABSTRACT

In general, in one aspect, the invention relates to a method for determining a system integrity of an oilfield machine operatively coupled to a magnetic drive, wherein the magnetic drive is configured to provide a controlled operational speed, comprising adjusting a control on the oilfield machine such that the oilfield machine operates at a baseline speed, recording a raw system integrity measurement while the oilfield machine is operating at the baseline speed, and calculating the system integrity using the raw system integrity measurement and a baseline system integrity measurement.

25 Claims, 3 Drawing Sheets

METHOD AND APPARATUS FOR DETERMINING SYSTEM INTEGRITY FOR AN OILFIELD MACHINE

BACKGROUND

When drilling in earth formations, the control (i.e., processing and handling) of solid materials (such as "cuttings" (i.e., pieces of a formation dislodged by the cutting action of teeth on a drill bit)) is of great importance. A variety of machines, such as shakers, centrifuges, blowers, pumps (including mud pumps), agitators, mixers, draw works, conveyors, etc. are used in the processing and handling of solid materials created during the drilling or completion stage. Combinations of these machines may also be used and such machines are well known in the art.

A typical concern, for example, is how to handle cuttings from the formation being drilled. After the cuttings have been transported to the surface of the well by a flow of a drilling fluid, disposal of the cuttings may pose a problem, particularly when the drilling fluid is oil-based or hydrocarbon-based. The oil from the drilling fluid (as well as any oil from the formation) often becomes associated with or adsorbed to the surfaces of the cuttings. The cuttings are then handled and disposed of in an environmentally friendly manner, especially in environmentally sensitive areas such as offshore operations.

U.S. Pat. No. 5,857,955 discloses one prior art centrifuge for use in oilfield applications. In particular, a centrifuge may be used to aid in the removal of dirt, sand, shale, abrasive cuttings, and/or silt particles from drilling fluid after the fluid has been circulated through a well so as to lift cuttings and other debris to the surface in an oilfield drilling operation. Moreover, U.S. Pat. No. 6,283,303 discloses a vibrating screen separator including an elongated, box-like, rigid bed, and a screen attached to, and extending across, the bed. The bed vibrates as the material to be separated is introduced to the screen, and the screen retains relatively large size material and passes the liquid and/or relatively small material into the bed. The bed can be vibrated by pneumatic, hydraulic, or rotary vibrators, and other means known in the art.

Operational control of the power transmission and forces (such as torque, conveyor speed, pump rate, etc.) involved with the types of oilfield machines such as those listed above is important to ensure efficient operation and to avoid failure of, for example, couplings and the like. Adjusting the rotational speed of (and the torque applied to) the drive shaft allows a user to maintain predetermined optimum operating conditions, regardless of variances in the flow rate of the feed slurry.

Due to the expense associated with purchasing and maintaining oilfield machines, it is desirable to operate the oilfield machines within an optimal range. This not only ensures that the oilfield machine is operating in the most cost effective manner, but also ensures that the oilfield machine is working properly, thereby minimizing safety risks, damage to the machine, etc. For example, overtime the bearings within an oilfield machine may deteriorate, thereby resulting in excessive wear and strain on the oilfield machine. Thus, what is needed is a method and apparatus to allow a user to readily determine the system integrity of the oilfield machine thereby providing the user insight into how the oilfield machine is performing.

SUMMARY

In general, in one aspect, the invention relates to a method for determining a system integrity of an oilfield machine operatively coupled to a magnetic drive, wherein the magnetic drive is configured to provide a controlled operational speed, comprising adjusting a control on the oilfield machine such that the oilfield machine operates at a baseline speed, recording a raw system integrity measurement while the oilfield machine is operating at the baseline speed, and calculating the system integrity using the raw system integrity measurement and a baseline system integrity measurement.

In general, in one aspect, the invention relates to an apparatus for use in oilfield applications, comprising a magnetic drive operatively coupled to an oilfield machine to provide a controlled operational speed, and a system integrity module operatively connected to the magnetic drive configured to determine a system integrity of the oilfield machine.

In general, in one aspect, the invention relates to a method for determining a system integrity of an oilfield machine operatively coupled to a magnetic drive, wherein the magnetic drive is configured to provide a controlled operational speed, comprising adjusting a control on the oilfield machine such that the oilfield machine operates at a baseline speed, determining a baseline system integrity measurement, recording a raw system integrity measurement while the oilfield machine is operating at the baseline speed, calculating the system integrity using the raw system integrity measurement and the baseline system integrity measurement, and determining whether the system integrity is within a selected range, wherein determining the baseline system integrity measurement comprises selecting the baseline speed at which to operate the oilfield machine, activating the oilfield machine, adjusting the control on the oilfield machine such that the oilfield machine operates at the baseline speed, recording the baseline system integrity measurement while the oilfield machine is operating at the baseline speed, and adjusting the baseline system integrity measurement after an initial use of the oilfield machine, wherein adjusting the baseline system integrity measurement after the initial use of the oilfield machine comprises activating the oilfield machine, adjusting the control on the oilfield machine such that the oilfield machine operates at the baseline speed, recording an adjusted baseline system integrity measurement while the oilfield machine is operating at the baseline speed, determining whether the adjusted baseline system integrity measurement is within a predetermined adjustment range relative to the baseline system integrity measurement, and setting the baseline system integrity measurement to equal to the adjusted baseline system integrity measurement if the adjusted baseline system integrity measurement is with the predetermined adjustment range.

In general, in one aspect, the invention relates to an apparatus for use in oilfield applications, comprising a magnetic drive operatively coupled to an oilfield machine to provide a controlled operational speed, and a system integrity module operatively connected to the magnetic drive configured to determine a system integrity of the oilfield machine, wherein the system integrity module includes functionality to record a raw system integrity measurement when the oilfield machine is operating at a baseline speed, recording a baseline system integrity measurement when the oilfield machine is operating at the baseline speed, calculate the system integrity using the raw system integrity measurement and the baseline system integrity measurement, and perform an appropriate action if the system integrity is outside the selected range.

Other aspects of the invention will be apparent from the following description and the appended claims.

DETAILED DESCRIPTION

Figure 1:
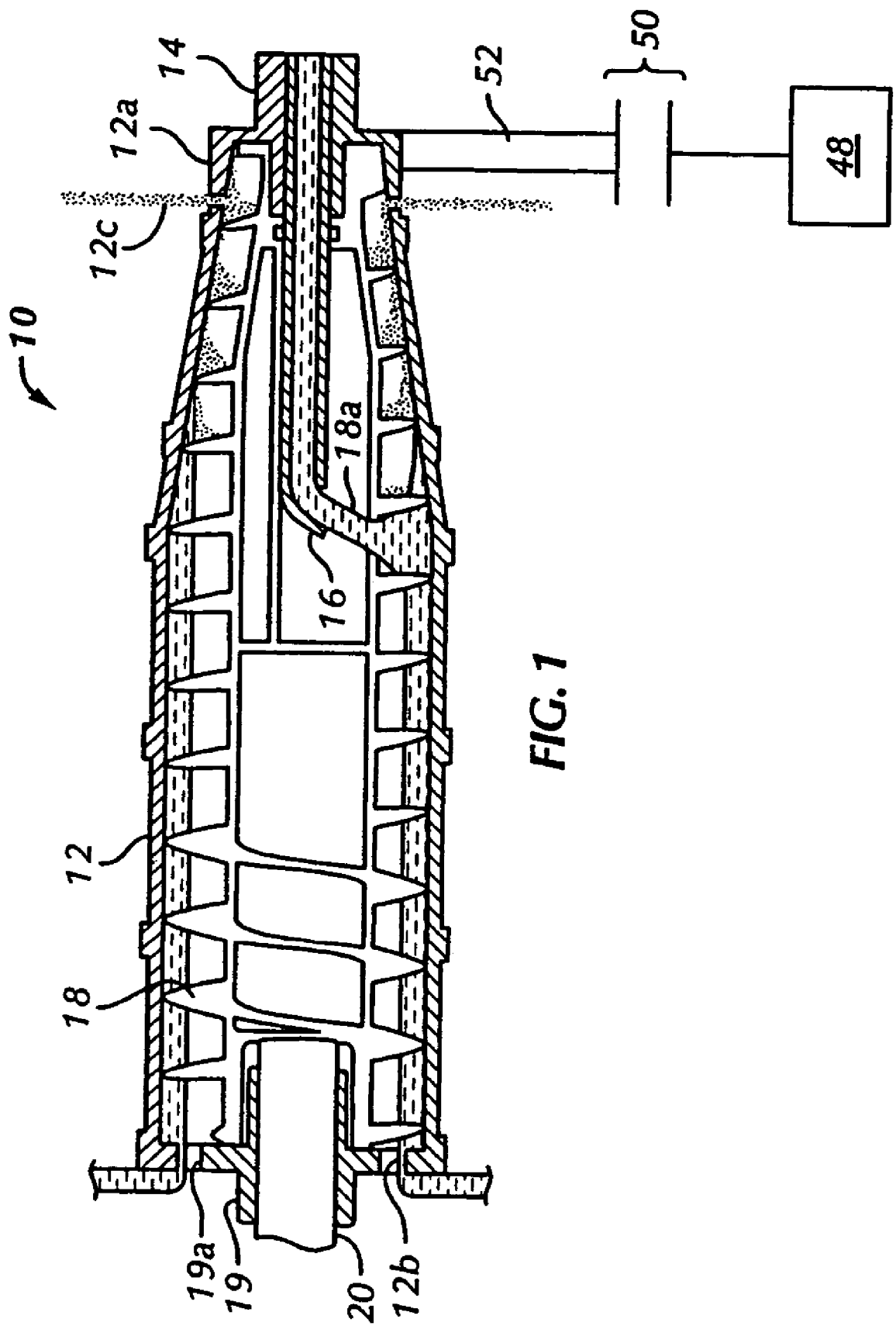
FIG. 1 shows a sectional view of a centrifuge according to one embodiment of the present invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present description relates to incorporating a system integrity module into magnetic power-transmission devices in outfield machinery. In some embodiments, magnetic power-transmission devices include high-powered, rare earth permanent magnets used as power transmission devices. In particular, in some embodiments, the present description incorporating system integrity modules in magnetic power-transmission devices integrated with oilfield machines such as shakers, centrifuges, blowers, pumps (including mud pumps), agitators, mixers, waste treatment equipment, conveyors, etc.

In other embodiments, the system integrity modules are incorporated into oilfield machines in which permanent magnets are incorporated as power transmission drives, such as shakers, centrifuges, blowers, pumps (including mud pumps), agitators, waste management equipment, draw works, top drive assemblies, mixers, conveyors, etc. Suitable permanent magnetic couplings and power transmission drives are disclosed, for example, in U.S. Pat. Nos. 6,337,527; 6,242,832; 6,072,258; 6,043,578; 6,005,317; 5,909,073; 5,903,075; 5,880,548; 5,834,872; 5,739,627; 5,712,520; 5,712,519; 5,691,587; 5,668,424; 5,477,094; 5,477,093 and 5,473,209. These patents are hereby incorporated by reference.

In general, incorporating the system integrity module within magnetic power transmission drives and over-torque protection couplings in oilfield machines provides improved performance, reliability, safety, increased operational life of the oilfield machines. In addition, energy efficiency in operating oilfield machines is improved. Note that the machinery listed herein is not intended to be limiting because the magnetic power transmission devices may be used with other oilfield machinery known in the art. Further, embodiments of the invention provide a way for users of an oilfield machine powered with magnetic power transmission drives to readily test the system integrity. In one embodiment of the invention, the system integrity of an oilfield machine corresponds to the percentage of a raw system integrity measurement with respect to a baseline system integrity measurement.

The principles of the invention are described below with respect to a centrifuge. Those skilled in the art will appreciate that while the invention has been described with respect to a centrifuge, the invention may be implemented with any oilfield machine that is controlled by a magnetic drive, and is not limited to the one shown in FIG. 1. Further, it is expressly within the scope of the present invention that rare earth, permanent magnets may be used in other oilfield applications other than the above described embodiment. In particular, these drives may be used in shakers, blowers, waste treatment equipment, waste management equipment, pumps (including mud pumps), agitators, draw works, top drive assemblies, mixers, conveyors, and a variety of other oilfield equipment.

Referring to FIG. 1, one embodiment of the present invention comprises a centrifuge 10. The centrifuge 10 includes an elongated bowl 12 supported for rotation about a longitudinal axis thereof. The bowl 12 has two open ends 12a and 12b, with the open end 12a adapted to receive a drive flange 14 that is connected to a drive shaft (not shown) for rotating the bowl 12. A longitudinal passage extends through the drive flange 14 for receiving a feed tube 16 that introduces a feed slurry (not shown) including, e.g., drill cuttings into the interior of the bowl 12.

A screw conveyor 18 extends within the bowl 12 in a coaxial relationship thereto and is supported for rotation within the bowl 12 in a manner to be described below. To this end, a hollow flanged shaft 19 is disposed in the end 12b of the bowl 12 and receives a drive shaft 20 of an external planetary gear box (not shown in FIG. 1) for rotating the screw conveyor 18 in the same direction as the bowl but at a different speed. One or more openings 18a extend through the wall of the conveyor 18 near the outlet end of the tube 16 so that the centrifugal forces generated by the rotating bowl 12 causes the slurry to gravitate radially outwardly and pass through the openings 18a and into the annular space between the conveyor 18 and the bowl 12.

The liquid portion of the slurry is displaced to the end 12b of the bowl 12 while the entrained solid particles in the slurry settle towards the inner surface (not separately numbered) of the bowl 12 because of the gravitational forces generated, and are scraped and displaced by the screw conveyor 18 back towards the end 12a of the bowl 12 for discharge through a plurality of discharge ports 12c formed through the wall of the bowl 12 near its end 12a. A plurality of openings 19a (two of which are shown) are provided through the flanged portion of the shaft 19 for discharging the separated liquid. This type of centrifuge is known in the art and, although not shown in the drawings, it is understood that the centrifuge 10 would be enclosed in a housing or casing, also in a conventional manner.

In this embodiment, a permanent magnet coupling 50 (i.e., magnetic coupling) is used to transmit torque to the centrifuge 10. The magnetic coupling 50 is connected to both a motor 48 and a drive shaft 52. Power is transferred from the motor 48 to the drive shaft 52 by operation of the magnetic coupling 50, which is described in detail below. A suitable coupling, incorporating a permanent, rare-earth magnet, in particular a NdFeB magnet sold under the name MagnaDrive Adjustable Speed Drive by MagnaDrive Inc. of Port Angeles, Wash., is operatively connected to the centrifuge 10 to enable continual variation of the speed and the torque applied to a drive shaft 52.

In one embodiment, the magnetic coupling 50 is connected to a drive shaft 52 of the centrifuge 10, which in turn, may be coupled to the bowl 12. The MagnaDrive Adjustable Speed Drive comprises a precision rotor assembly containing high-energy permanent magnets and a copper conductor assembly. Relative motion between the magnets and copper rings creates a magnetic field that transmits torque across an air gap. Varying the width of the gap changes the coupling force, producing a controlled and infinitely variable output speed.

The width of the air gap is controlled by an actuator (not shown). The actuator typically receives signals from a control unit, interprets the signals, and then adjusts the air gap accordingly. In one embodiment of the invention, the control unit includes at least a processor and a memory including software instructions to signal the actuator. In one embodiment of the invention, the control unit sends signals in milli-amp units to the actuator. In addition, the memory usually includes software instructions to receive and interpret input from a rotations-per-minute ("RPM") sensor. The RPM sensor corresponds to any sensor that includes functionality to determine the RPM of the centrifuge, e.g., a proximity sensor, etc. The aforementioned mentioned components (i.e., the actuator, the control unit, and the RPM sensor) form a feedback loop allowing the control unit to adjust the RPM of the centrifuge. Though not shown in FIG. 1, the control unit is operatively connected to the centrifuge 10 via the MagnaDrive Adjustable Speed Drive.

In one embodiment of the invention, the control unit includes a system integrity module. In one embodiment of the invention, the control unit includes one or more programmable logic controllers, one of which includes the system integrity module. The system integrity module includes functionality to determine the system integrity of the centrifuge 10. More specifically, in one embodiment of the invention, the system integrity module includes functionality to determine and set a baseline system integrity measurement, adjust the baseline system integrity measurement, obtain a raw system integrity measurement, compare the raw system integrity measurement to the baseline system integrity measurement, perform an appropriate action depending on the results of the comparison, etc. Embodiments of the operation of the system integrity module are described in FIGS. 2 and 3 below.

Figure 2:
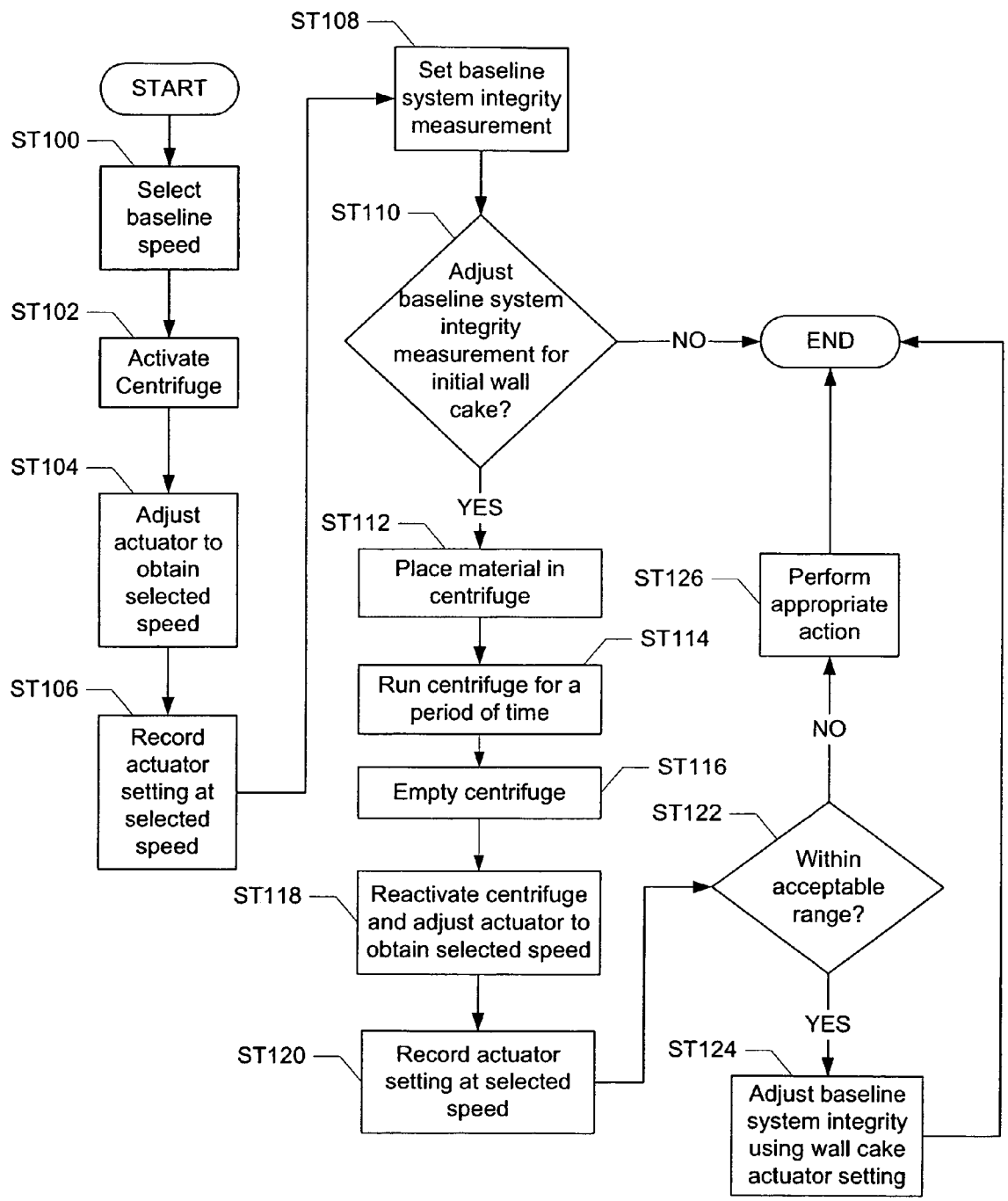
FIGS. 2–3 show flowcharts in accordance with one embodiment of the invention.

FIG. 2 shows a flowchart detailing an embodiment of a method for setting a baseline system integrity measurement. Initially, a baseline speed is selected ST100. The baseline speed typically corresponds to the speed that the centrifuge must be operated at to obtain a system integrity measurement. The baseline speed may be set at any level. Further, the baseline speed may be specified in RPMs, etc. Once the baseline speed has been selected, the centrifuge is activated (i.e., started) ST102. The actuator is subsequently adjusted until the centrifuge is operating at the baseline RPM ST104. As noted above, the actuator is adjusted via the control unit which sends a signal to the actuator in the form of mA (or other suitable units). Further, the control unit determines how to adjust the actuator using information received from the RPM sensors (e.g., proximity sensors) tracking the speed of the centrifuge.

Once the centrifuge is operating at the baseline RPM, the actuator setting is recorded (e.g., the mA setting of the actuator) ST 106. The actuator reading obtained in ST106 is subsequently set as the baseline system integrity measurement ST108. A determination is then made whether to adjust the baseline system integrity measurement to take into account the initial wall cake ST110. In one embodiment of the invention, the baseline system integrity measurement may be adjusted using the initial wall cake to provide a more accurate representation of the system integrity, as opposed to using the baseline system integrity measurement.

If the user does not wish to adjust the baseline system integrity measurement to take into account the initial wall cake, then no further action is taken. Alternatively, if the baseline system integrity measurement is to be adjusted to take into account the initial wall cake, then an initial amount of material is placed in the centrifuge (e.g., an amount of material that corresponds to the typical amount of material to be placed in the centrifuge during operation) ST112. The centrifuge is subsequently activated and run for a period of time ST114. The centrifuge is subsequently emptied ST116. At this stage there is a wall cake, i.e., an initial amount of material that adheres to the inside of the centrifuge. Those skilled in the art will appreciate that ST112–ST116 may correspond to the initial use of the centrifuge (i.e., the first use after manufacturing, refurbishing, or repairing a machine).

The centrifuge is then reactivated and the actuator is adjusted until the centrifuge is operating at the baseline speed ST118. The actuator reading is subsequently obtained ST120. A determination is then made as to whether the actuator reading from ST120 is within an acceptable range ST122. In one embodiment of the invention, the percentage of the actuator reading with respect to the baseline system integrity measurement (both in the same units) is used to determine whether the actuator reading is within an acceptable range. Those skilled in the art will appreciate that the actuator reading may deviate from 100% of the baseline system integrity measurement as the wall cake may place additional load on the centrifuge, thereby decreasing the system integrity. However, if the percentage difference is large, then this may indicate a problem with the centrifuge (i.e., the bearings are worn out, etc.) as opposed to a decrease in system integrity due to the minimal load caused by the initial wall cake. Thus, ST122 is typically performed as an additional check to ensure that there are no problems with the centrifuge.

In one embodiment of the invention, the acceptable range may be within 5% of the baseline system integrity. However, the acceptable range may be smaller or larger depending on a number of centrifuge specific factors including design, materials used in construction, type of material that makes up the wall cake, etc. If the actuator reading is within an acceptable range, then the baseline system integrity measurement may be set to equal the actuator reading obtained in ST120 above ST124. Alternatively, if the actuator reading is outside an acceptable range, then an appropriate action may be performed ST126. In one embodiment of the invention, the acceptable action corresponds to not adjusting the baseline system integrity (i.e., keeping the baseline system integrity measurement obtained in ST108). Alternatively, the centrifuge may be shut down to allow the user to adjust and/or repair various components within the centrifuge such that it operates in an acceptable range.

Those skilled in the art will appreciate that the aforementioned method is typically performed when the machine is new and/or every time the centrifuge is serviced, rebuilt, or any other time when the centrifuge is considered to have near 100% system integrity.

Those skilled in the art will appreciate that while the invention was described using a system integrity measurement that corresponds to an actuator reading, the system integrity measurement may be any measureable parameter that is causally-linked to the power requirements required to run an oilfield machine at a given speed.

Figure 3:
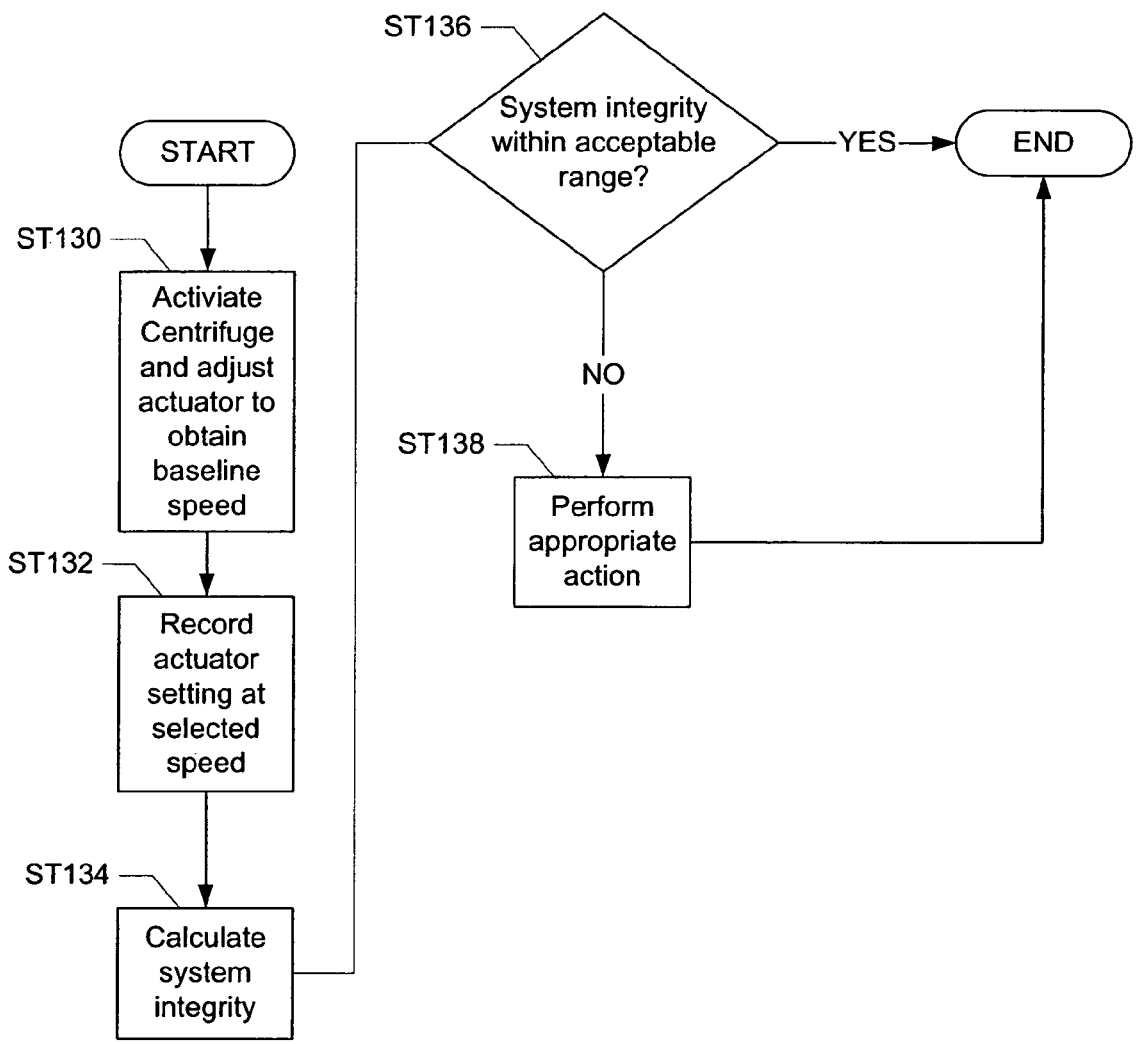

FIG. 3 details an embodiment for using the baseline system integrity measurement to obtain a system integrity and perform an action based on the system integrity. Initially, the centrifuge is activated and the actuator adjusted such that the centrifuge is operated at the baseline speed ST130. The actuator reading is subsequently recorded (i.e., the raw system integrity measurement is obtained) ST132. The system integrity is subsequently calculated ST134. In one embodiment of the invention, the system integrity corresponds to the percentage of the raw system integrity measurement with respect to the baseline system integrity measurement (e.g., the raw system integrity measurement may be 80% of the baseline system integrity measurement). A determination is then made as to whether the system integrity is within an acceptable range ST136.

In one embodiment of the invention, for example, if the system integrity is less than 60%, then the centrifuge may be considered to be operating outside of the acceptable range. Those skilled in the art will appreciate that the acceptable range may depend on a number of factors including the type of centrifuge, material being fed into the centrifuge, etc. For example, a system integrity reading of less than 60% could indicate that an internal bearing has or is about to fail. Internal mechanical components are not easily monitored, so embodiments of the present invention provide a method for monitoring system performance, which advantageously may prevent damage to a system and/or reduce the likelihood of complete failure. If the system integrity indicates that the centrifuge is operating outside the normal range, then an appropriate action is performed ST138. In one embodiment of the invention, the centrifuge is automatically shut down and the user is notified that the centrifuge needs to be serviced. Alternatively, depending on how far outside the acceptable range the centrifuge is operating, the user may be allowed to continue using the machine and but is notified that the centrifuge needs to be serviced. In alternate embodiments, the amount of hours of operational life may be displayed (which may be extrapolated, for example, from the baseline system reading and the present reading). For example, if the system integrity was losing 0.25% per day (on average), the system could display that a maximum of 160 days remain until recommended servicing (40%)/(0.25%/day)). Also, the system may further include an alarm notification if the system integrity falls beneath a certain level. Further, in other embodiments the system integrity may be remotely monitored (i.e., the central display may be accessed via the Internet).

Those skilled in the art will appreciate that the method described in FIG. 3 may be performed every time the centrifuge is activated. Further, the method described in FIG. 3 may be performed whenever the user would like to perform a system integrity check, for example, by pressing a test switch, selecting a test command, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a system integrity of an oil field machine operatively coupled to a magnetic drive, wherein the magnetic drive is configured to provide a controlled operational speed, comprising:
   adjusting a control on the oil field machine such that the oilfield machine operates at a baseline speed;
   determining a baseline system integrity measurement while the oilfield machine is operating at the baseline speed;
   recording a raw system integrity measurement while the oilfield machine is operating at the baseline speed; and
   calculating the system integrity using the raw system integrity measurement and a the baseline system integrity measurement.

2. The method of claim 1, further comprising:
   determining whether the system integrity is within a selected range.

3. The method of claim 2, further comprising:
   performing an appropriate action if the system integrity is outside the selected range.

4. The method of claim 3, wherein the appropriate action comprises notifying an oilfield machine operator.

5. The method of claim 3, wherein the appropriate action comprises shutting down the oilfield machine.

6. The method of claim 1, further comprising setting the oilfield machine to operate at the baseline speed.

7. The method of claim 1, wherein determining the baseline system integrity measurement comprises:
   selecting the baseline speed at which to operate the oilfield machine;
   activating the oilfield machine;
   adjusting the control on the oilfield machine such that the oilfield machine operates at the baseline speed; and
   recording the baseline system integrity measurement while the oilfield machine is operating at the baseline speed.

8. The method of claim 7, further comprising:
   adjusting the baseline system integrity measurement after an initial use of the oilfield machine.

9. The method of claim 8, wherein adjusting the baseline system integrity measurement after the initial use of the oilfield machine comprises:
   activating the oilfield machine;
   adjusting the control on the oilfield machine such that the oilfield machine operates at the baseline speed;
   recording an adjusted baseline system integrity measurement while the oilfield machine is operating at the baseline speed;
   determining whether the adjusted baseline system integrity measurement is within a predetermined adjustment range relative to the baseline system integrity measurement; and
   setting the baseline system integrity measurement to equal to the adjusted baseline system integrity measurement if the adjusted baseline system integrity measurement is within the predetermined adjustment range.

10. The method of claim 9, wherein the raw system integrity measurement, the baseline system integrity measurement, and the adjusted baseline system integrity measurement comprise an actuator reading.

11. The method of claim 1, wherein the control comprises a programmable logic controller operatively connected to the oilfield machine.

12. The method of claim 1, wherein the system integrity comprises a percentage of the raw system integrity measurement with respect to the baseline system integrity measurement.

13. The method of claim 1, wherein the oilfield machine comprises at least one machine selected from the group consisting of shakers, blowers, waste treatment equipment, waste management equipment, centrifuges, pumps, mud pumps, draw works, top drive assemblies, agitators, mixers, and conveyors.

14. An apparatus for use in oilfield applications, comprising:

a magnetic drive operatively coupled to an oilfield machine to provide a controlled operational speed; and a system integrity module operatively connected to the magnetic drive configured to determine a system integrity of the oilfield machine, wherein the system integrity module includes functionality to:

record a raw system integrity measurement when the oilfield machine is operating at a baseline speed, record a baseline system integrity measurement when the oilfield machine is operating at the baseline speed, calculate the system integrity using the raw system integrity measurement and the baseline system integrity measurement, and perform an appropriate action if the system integrity is outside the selected range.

15. The apparatus of claim 14, wherein the system integrity module is activated using a test switch.

16. The apparatus of claim 14, wherein the system integrity module is located in a programmable logic control of the oilfield machine.

17. The apparatus of claim 14, wherein the system integrity of the oilfield machine comprises a percentage of a raw system integrity measurement with respect to a baseline system integrity measurement.

18. The apparatus of claim 14, wherein the system integrity module includes functionality to:

determine whether the system integrity is within a selected range.

19. The apparatus of claim 14, wherein the appropriate action comprises notifying an oilfield machine operator.

20. The apparatus of claim 14, wherein the appropriate action comprises shutting down the oilfield machine.

21. The apparatus of claim 14, wherein the system integrity module includes functionality to:

adjust the baseline system integrity measurement during an initial use of the oilfield machine.

22. The apparatus of claim 21, wherein the functionality to adjust the baseline system integrity measurement during the initial use of the oilfield machine, comprises:

recording an adjusted baseline system integrity measurement when the oilfield machine is operating at the baseline speed during the initial use of the oilfield machine;

determining whether the adjusted baseline system integrity measurement is within a predetermined adjustment range relative to the baseline system integrity measurement; and setting the baseline system integrity measurement to equal to the adjusted baseline system integrity measurement if the adjusted baseline system integrity measurement is within the predetermine adjustment range.

23. The apparatus of claim 22, wherein the raw system integrity measurement, the baseline system integrity measurement, and the adjusted system integrity measurement comprise an actuator reading.

24. The apparatus of claim 14, wherein the oilfield machine comprises at least one machine selected from the group consisting of shakers, blowers, waste treatment equipment, waste management equipment, centrifuges, pumps, mud pumps, draw works, top drive assemblies, agitators, mixers, and conveyors.

25. A method for determining a system integrity of an oilfield machine operatively coupled to a magnetic drive, wherein the magnetic drive is configured to provide a controlled operational speed, comprising:

adjusting a control on the oilfield machine such that the oilfield machine operates at a baseline speed;

determining a baseline system integrity measurement;

recording a raw system integrity measurement while the oilfield machine is operating at the baseline speed;

calculating the system integrity using the raw system integrity measurement and the baseline system integrity measurement; and determining whether the system integrity is within a selected range, wherein determining the baseline system integrity measurement comprises:

selecting the baseline speed at which to operate the oilfield machine, activating the oilfield machine, adjusting the control on the oilfield machine such that the oilfield machine operates at the baseline speed, recording the baseline system integrity measurement while the oilfield machine is operating at the baseline speed, and adjusting the baseline system integrity measurement after an initial use of the oilfield machine, wherein adjusting the baseline system integrity measurement after the initial use of the oilfield machine comprises:

activating the oilfield machine, adjusting the control on the oilfield machine such that the oilfield machine operates at the baseline speed, recording an adjusted baseline system integrity measurement while the oilfield machine is operating at the baseline speed, determining whether the adjusted baseline system integrity measurement is within a predetermined adjustment range relative to the baseline system integrity measurement, and setting the baseline system integrity measurement to equal to the adjusted baseline system integrity measurement if the adjusted baseline system integrity measurement is within the predetermined adjustment range.

* * * * *